US008753703B2

(12) United States Patent
Gunawardena et al.

(10) Patent No.: US 8,753,703 B2
(45) Date of Patent: Jun. 17, 2014

(54) CONTINUOUS PROCESS FOR COOKING BACON WITH IMPROVED RECOVERY

(75) Inventors: Ramesh M. Gunawardena, Solon, OH (US); Todd Gerold, Huron, OH (US); David D. Rupp, Jr., Sandusky, OH (US)

(73) Assignee: John Bean Technologies Corporation, Chicago, IL (US)

( * ) Notice: Subject to any disclaimer, the term of this patent is extended or adjusted under 35 U.S.C. 154(b) by 1051 days.

(21) Appl. No.: 12/589,502

(22) Filed: Oct. 23, 2009

(65) Prior Publication Data
US 2010/0112169 A1 May 6, 2010

Related U.S. Application Data

(60) Provisional application No. 61/197,209, filed on Oct. 24, 2008.

(51) Int. Cl.
*A23C 3/00* (2006.01)
*A01J 11/04* (2006.01)
*B65G 13/02* (2006.01)
*B65G 15/54* (2006.01)

(52) U.S. Cl.
USPC .............. 426/523; 99/467; 198/778; 198/848

(58) Field of Classification Search
CPC ....... A23L 1/0121; A23L 1/0135; A23L 1/31; A23L 3/361; B65G 2207/24; B65G 21/18; B65G 2812/02386; B65G 2201/0202
USPC ............ 426/523, 510, 511; 99/326, 330, 347, 99/360, 363, 365, 443, 423; 198/778, 849, 198/848; 219/392, 388, 391, 492, 628, 620, 219/653, 657, 40
See application file for complete search history.

(56) References Cited

U.S. PATENT DOCUMENTS

| 3,873,755 A * | 3/1975 | McKay .......................... 426/523 |
| 4,587,946 A | 5/1986 | Doyon et al. |
| 4,591,333 A | 5/1986 | Henke |
| 4,648,377 A | 3/1987 | Van Camp |

(Continued)

OTHER PUBLICATIONS http://www.sweco.com/sifter_news_pro0909.html. Paged dated Sep. 2009.*

*Primary Examiner* — Rena L Dye
*Assistant Examiner* — Lela S Williams
(74) *Attorney, Agent, or Firm* — Pauley Petersen & Erickson

(57) ABSTRACT

An process for cooking bacon includes the steps of continuously feeding bacon strips in three or more rows to an inlet of a spiral cooking oven, moving the bacon strips along a spiral path inside the spiral oven, applying a cooking fluid into the spiral oven and through the spiral path, and cooking the bacon strips in the spiral oven to a yield percentage having a mean bandwidth variation not greater than 4.5%. A conveyor belt having variable weaving includes belt openings that are initially larger through an inner side of the belt than through an outer side of the belt, when the belt is straight. When the belt collapses into the spiral configuration, the openings adjust so that the areal size of the openings is similar on both lateral sides of the belt, resulting in more even distribution of cooking fluid and more uniform cooking.

19 Claims, 8 Drawing Sheets

(56) References Cited

U.S. PATENT DOCUMENTS

| | | |
|---|---|---|
| 4,792,303 A | 12/1988 | Stewart et al. |
| 4,823,766 A | 4/1989 | Violi |
| 4,909,236 A | 3/1990 | Del Fabbro |
| 5,065,860 A * | 11/1991 | Faulkner .................. 198/848 |
| 5,078,120 A | 1/1992 | Hwang |
| 5,243,962 A | 9/1993 | Hwang |
| 2007/0131215 A1 | 6/2007 | McVeagh et al. |
| 2009/0181138 A1* | 7/2009 | Howard .................. 426/233 |

* cited by examiner

CONTINUOUS PROCESS FOR COOKING BACON WITH IMPROVED RECOVERY

CROSS REFERENCE TO RELATED APPLICATION

This patent application claims priority under 35 U.S.C. §119(e)(1) to U.S. Provisional Application Ser. No. 61/197,209, filed on 24 Oct. 2008, the disclosure of which is incorporated by reference.

FIELD OF THE INVENTION

This invention is directed to a continuous process for cooking bacon, in which the weight percent of the cooked bacon relative to the raw uncooked bacon is higher, and the bacon is cooked more uniformly.

BACKGROUND OF THE INVENTION

Commercial cooking of bacon has conventionally been performed in linear industrial microwave cooking systems that occupy substantial floor space in a food processing facility or other location and involve high energy costs. As the bacon is cooked, it shrinks and loses weight rapidly due primarily to the removal of fat. The bacon is cooked until it reaches a yield percentage determined by dividing the weight of the cooked bacon by the weight of the starting uncooked bacon. The desired yield percentage can be determined empirically for a particular oven, and must be low enough so that the bacon is thoroughly cooked and suitable for consumption.

Industrial microwave cooking ovens have a level of cooking nonuniformity which can be defined in terms of standard deviations. In one example, a particular type of bacon may be thoroughly cooked at a yield percentage of 40 or lower. In order to ensure that all of the bacon in the oven is thoroughly cooked, it may be desirable to set the yield percentage for the oven to a target percentage that is three standard deviations below the yield percentage of 40. If the oven has a standard deviation of 3%, then the target yield percentage for the oven would have to be set at 31 in order to ensure that substantially all of the bacon is cooked to a yield percentage of 40 or lower. At a target yield percentage of 31, approximately two-thirds of the bacon in the oven would be cooked to yield percentages between 28 and 34 (within one standard deviation). Approximately 95% of the bacon in the oven would be cooked to yield percentages between 25 and 37 (within two standard deviations of 31), and over 99% of the bacon would be cooked to yield percentages between 22 and 40 (within three standard deviations of 31). Essentially no bacon would be undercooked to a yield percentage greater than 40.

Another measure of cooking nonuniformity is the mean bandwidth variation. To determine the mean bandwidth variation, it is necessary to divide the cooking conveyor belt in to three sections of equal width. Then, determine the mean yield percentages for bacon strips placed and cooked in the first side portion, the center portion, and the second side portion of the belt. The mean bandwidth variation is the difference between the highest and the lowest of the three mean yield percentages. For example, if the first side portion has a mean yield percentage of 39.7, the center portion has a mean yield percentage of 33.7, and the second side portion has a mean yield percentage of 35.9, then the mean bandwidth variation will be 6.0% (the difference between 39.7 and 33.7). If the mean bandwidth variation is used as a control parameter, then the oven should be set so that the target yield percentage is no higher than the yield percentage required for fully cooked bacon minus the mean bandwidth variation.

Because of the wide variations in cooking experienced in industrial microwave processes, and the relatively high standard deviations and mean bandwidth variations, it has been necessary to set the target percentage for the oven far below the yield percentage needed for thoroughly cooked bacon, in order to ensure that all of the bacon is thoroughly cooked. There is a need or desire for an industrial bacon cooking process that has far greater uniformity and lower mean bandwidth variation so that the overall yield can be increased without undercooking any portion of the bacon. There is also a need or desire for an industrial bacon cooking process that occupies less floor space. There is also a need or desire for an industrial bacon cooking process that yields more uniformly cooked bacon.

SUMMARY OF THE INVENTION

The present invention is directed to a continuous process for cooking bacon which has improved cooking uniformity. In one embodiment, the process includes the steps of continuously feeding bacon strips in three or more rows to an inlet of a spiral cooking oven, moving the bacon strips along a spiral path inside the spiral oven, applying a cooking medium into the spiral oven and through the spiral path, and cooking the bacon strips in the spiral oven to a yield percentage having a mean bandwidth variation not greater than 4.5%.

In another embodiment, the process includes the steps of continuously feeding bacon strips to an inlet of a spiral cooking oven, moving the bacon strips along a conveyor belt having variable weaving and a spiral path inside the spiral oven, applying a cooking medium into the spiral oven and through the conveyor belt, and cooking the bacon strips in the spiral oven.

In another embodiment, the process includes the steps of continuously feeding bacon strips to an inlet of a spiral cooking oven, moving the bacon strips along a conveyor belt defining a spiral path inside the spiral oven, applying a cooking medium into the oven and through the conveyor belt, and cooking the bacon strips in the oven, wherein the spiral path defined by the oven has at least 10 tiers and an inner mezzanine floor having an adjustable height is positioned in an eye of the spiral path.

With the foregoing in mind, it is a feature and advantage of the invention to provide a continuous process for cooking bacon that has improved cooking uniformity and higher overall yield percentage, and requires substantially less floor space than linear microwave oven cooking processes of the prior art.

DETAILED DESCRIPTION OF THE INVENTION

Figure 1:
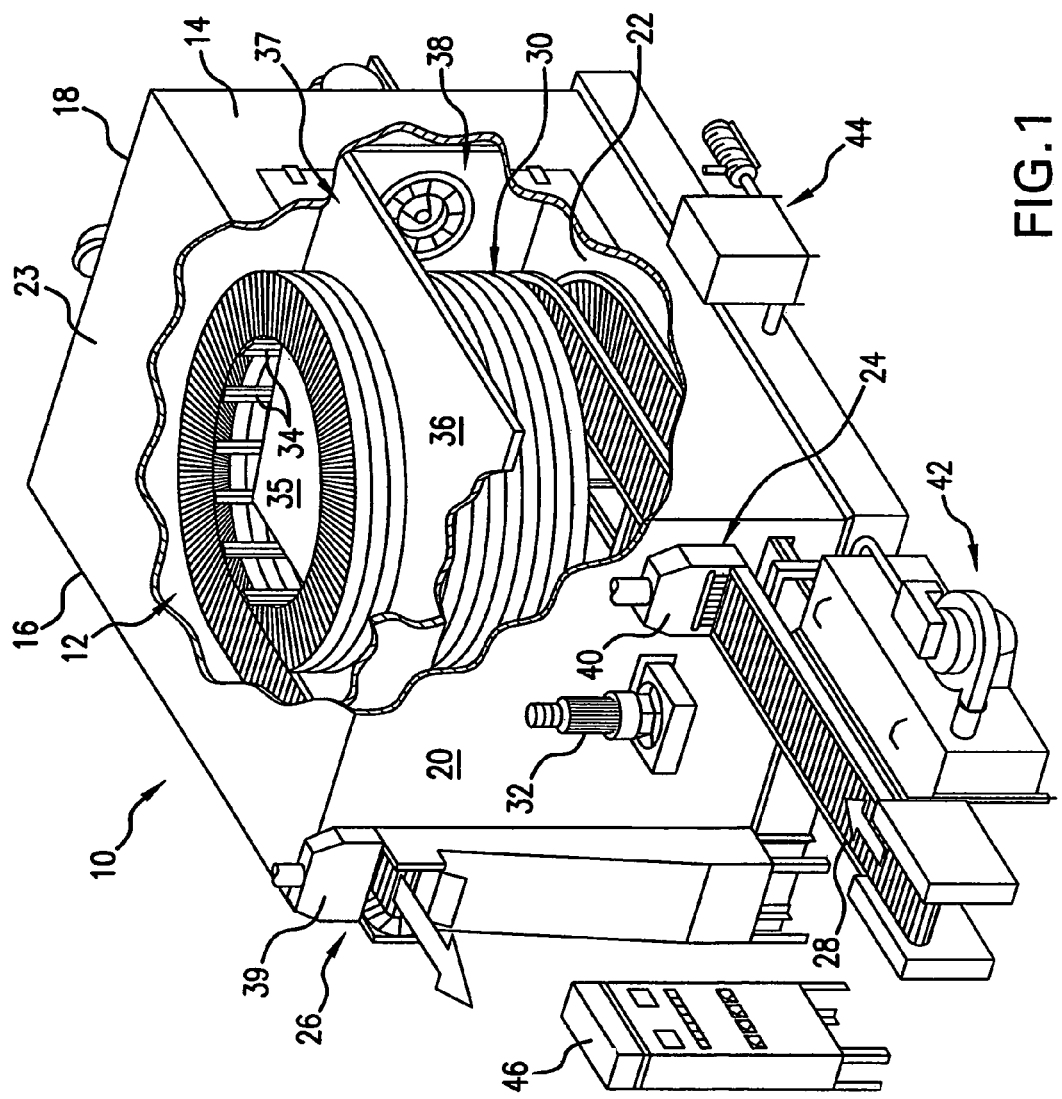
FIG. 1 is a partial cutaway perspective view of a spiral oven which can be used to practice the continuous process of the invention.

In accordance with the invention, a continuous process for cooking bacon is provided. Strips of bacon, cut to a desired thinness which is typical of bacon, are fed to an inlet of a spiral cooking oven. An exemplary spiral cooking oven is described in detail in U.S. Pat. No. 5,243,962 to Hwang, the disclosure of which is incorporated by reference, and is modified as described herein. Referring to FIG. 1, spiral cooking oven 10 includes a cooking chamber 12 having front wall 14, back wall 16, side walls 18 and 20, a floor 22 and a top wall 23. The walls define a substantially enclosed chamber having an inlet 24 and an outlet 26 formed in at least one of the front, back or side walls 14, 16, 18 and 20 through which the bacon strips are introduced to and removed from cooking chamber 12. Inlet and outlet openings 24 and 26 are suitably as small as possible to minimize the escape of cooking fluid from chamber 12. The chamber 12 may be equipped with a cleaning system 44. The chamber walls may be double walls having insulation in the intermediate space. In the embodiment shown, inlet 24 is in a lower region of side wall 20 and outlet 26 is in an upper region of side wall 20. In another particularly suitable embodiment, inlet 24 can be in a lower region of side wall 20 and outlet 26 can be at the same elevation in a lower region of opposing side wall 18. Exhaust stacks 40 and 33 associated with inlet 24 and outlet 26, respectively, help regulate the ingress or egress of cooking fluid and air from these locations. Control station 46 controls the operation of oven 10.

An endless conveyor belt 28, suitably having a variable weaving, carries the bacon strips into spiral cooking oven 10 through inlet 24. A belt cleaning system 42 may continuously clean the conveyor belt 28 before bacon strips are applied to it. The conveyor belt 28 is driven by motor 32 and is adapted to follow, through most of its length, a spiral path defining a plurality of superimposed, helically extending spiral tiers 30 forming a belt pile. The conveyor belt 28 may be woven to have variable sized openings when the belt is straight so that when an inward side of the belt is curved inward to form the spiral path, the openings on that side partially collapse and assume a smaller effective size that is about equal to the size of the openings on an outward side of the belt. One or more vertically movable mezzanine floors 35 supported by steel posts 34 can be used to help regulate the flow of cooking fluid within chamber 12, as explained further below.

Figure 3:
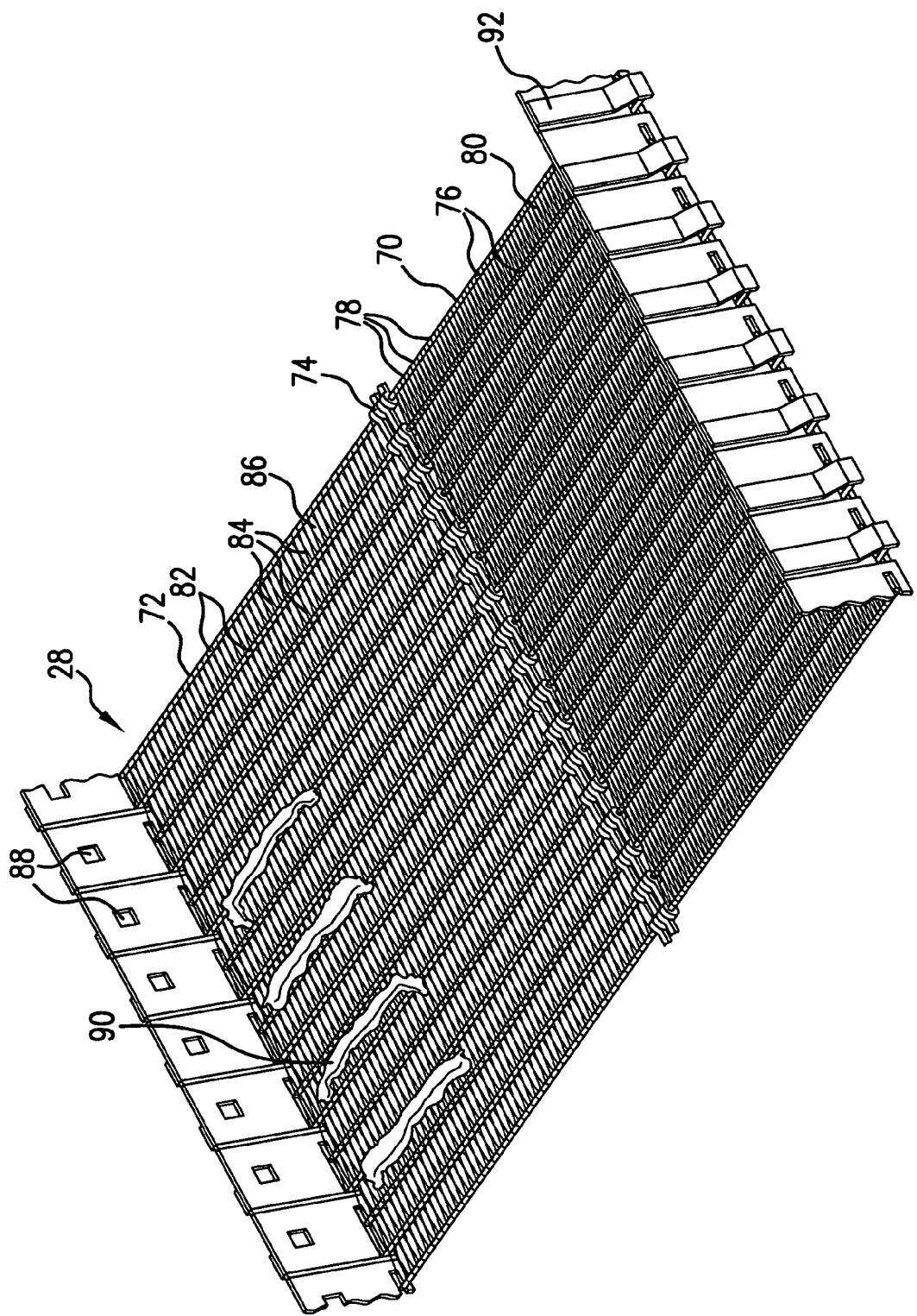
FIG. 3 is a top perspective view of a conveyor belt having variable openings useful in the process of the invention.
Figure 4:
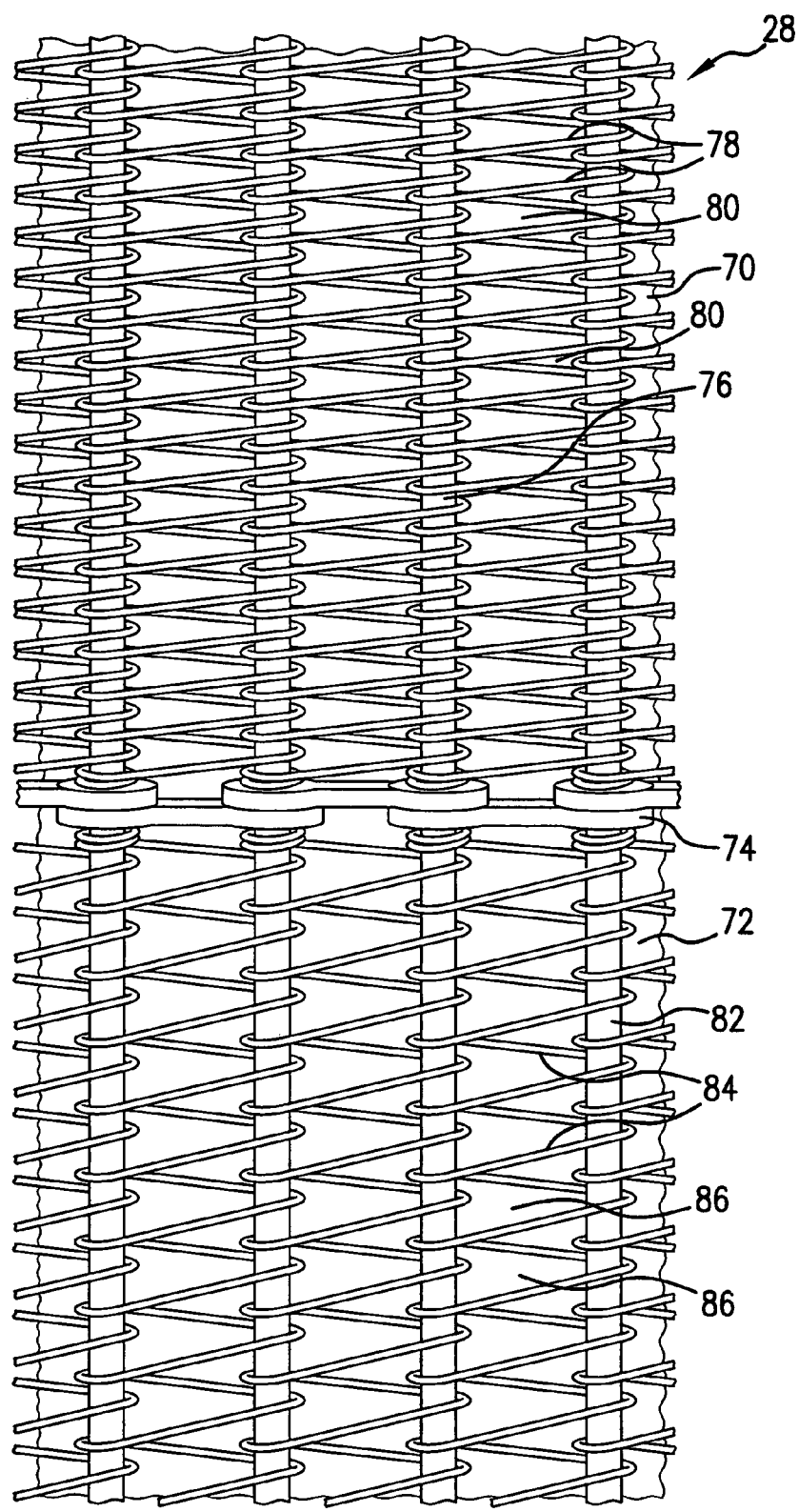
FIG. 4 is an exploded cutout view showing a portion of the conveyor of FIG. 3.

The variable weaving can be progressive to cause larger openings on lateral side of the belt that the other when the belt is straight. FIGS. 3 and 4 illustrate one embodiment of a conveyor belt 28 having variable sized openings. The belt 28 has an outer portion 70 and an inner portion 72 joined together by a center link 74. The outer portion 70 includes a plurality of support rods 76 oriented along the width of the belt and a plurality of links 78 formed by weaving a wire material around the support rods 76 to form openings 80. The inner portion 72 includes a plurality of support rods 82 oriented along the width of the belt 28 and coextensive with support rods 76, and a plurality of links 84 formed by weaving a wire material around support rods 82 to form openings 86. Openings 86 are larger than openings 80 when the belt 28 is straight. In one embodiment, when belt 28 is straight, the pitch between adjacent links 84 is about 12-15 mm, suitably about 13 mm, while the pitch between adjacent links 78 is about 7-11 mm, suitably about 9 mm. When the belt assumes a spiral configuration, the support rods 82 move closer together, reducing the areal size of openings 86 in the inner portion 72 to approximate the areal size of openings 80 in the outer portion 70. The belt 28 can be driven by any suitable technique. Upright rails 90 and 92 provide for self-stacking of tiers 30 in the spiral pattern.

Figure 2:
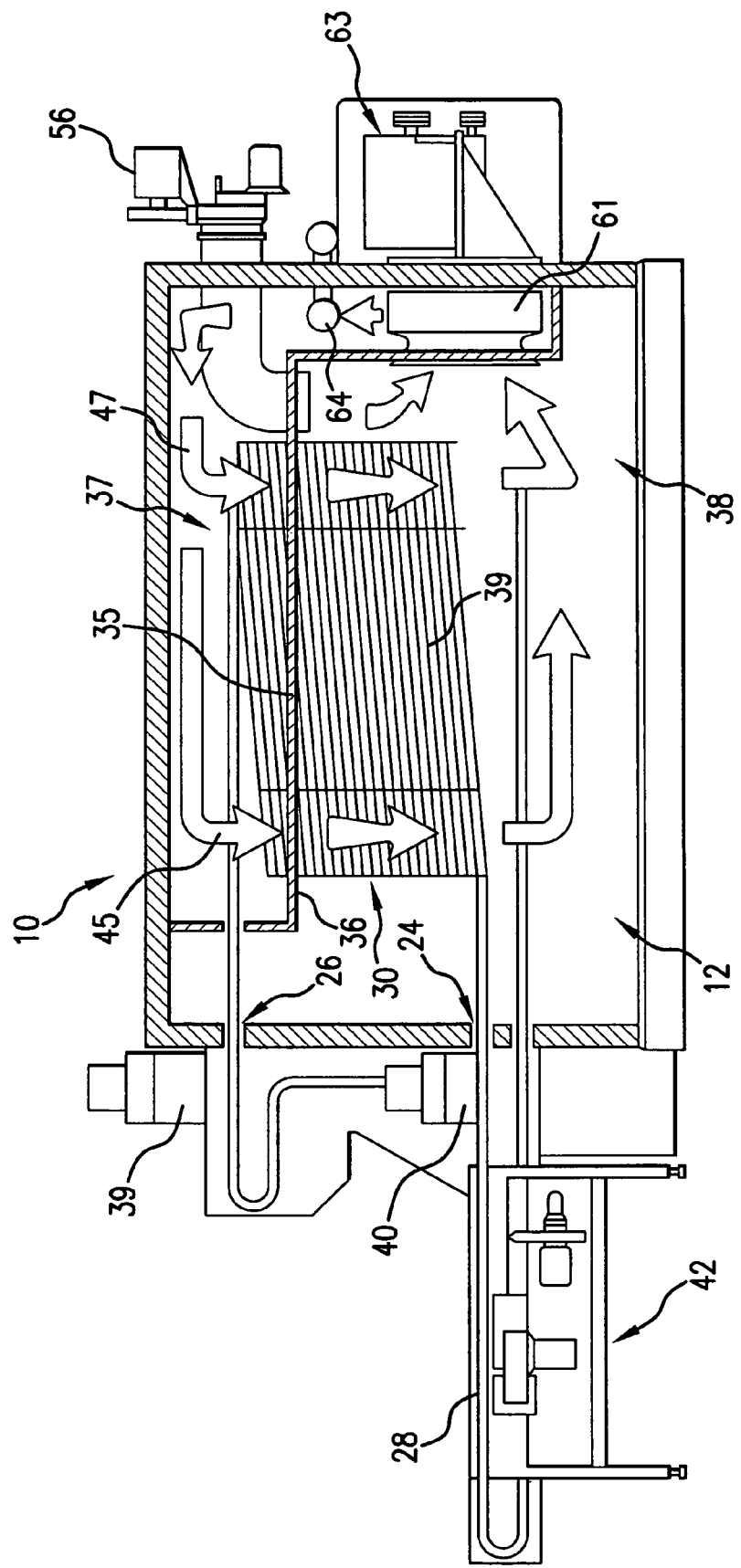
FIG. 2 is a side view of the spiral oven of FIG. 1 taken in section through the cooking chamber and showing generally the circulation of cooking fluid within the cooking chamber.

Referring to FIG. 2, the operation of the oven 10 can proceed as follows. The cooking environment within oven 10 can be facilitated using a thermal fluid heat exchanger 56. Steam from a source 64 or another heated cooking fluid can be supplied into a low pressure region 38 in the vicinity of one or more recirculation fans 61. Other heating means can alternatively be employed, such as a gas fired burner or electric heater. The one or more recirculation fans 61 can be driven by one or more electric motors 63 at desired speeds. Fans 61 can circulate the cooking fluid from low pressure region 38 and redistribute it at high velocity into high pressure region 37 of cooking chamber 12.

The cooking fluid can be any suitable cooking medium that is suitable for cooking bacon strips. The cooking fluid can be condensing steam, high pressure condensing steam, heated air, or a mixture of condensing steam and air. Steam at atmospheric pressure or up to about 60 pounds per square inch ("psi") combined with heated air is particularly suitable for the rapid and uniform cooking of bacon strips. The cooking fluid is injected and recirculated within the cooking chamber and designed to flow vertically downward through the spiral tiers 30 of the conveyor belt 80 in the direction of arrows 45 and 47. The outer mezzanine 36 is stationary. A vertically movable inner mezzanine floor 35 restricts or blocks flow of the cooking fluid through the eye 39 defined by the spiral tiers 30, causing most of the cooking fluid to pass directly through the conveyor belt openings 80 and 86 in the spiral tiers 30. Two or more vertically movable mezzanine floors can also be provided at strategic vertical locations in the eye 39. Because the openings 80 and 86 have the same or similar effective areal sizes when the belt 28 is in the spiral configuration as explained above, the flow of cooking fluid through the outer region 70 and inner region 72 of the conveyor 28 is substantially uniform, resulting in, substantially uniform cooking of bacon strips in the outer and inner regions of spiral tiers 30.

Figure 5:
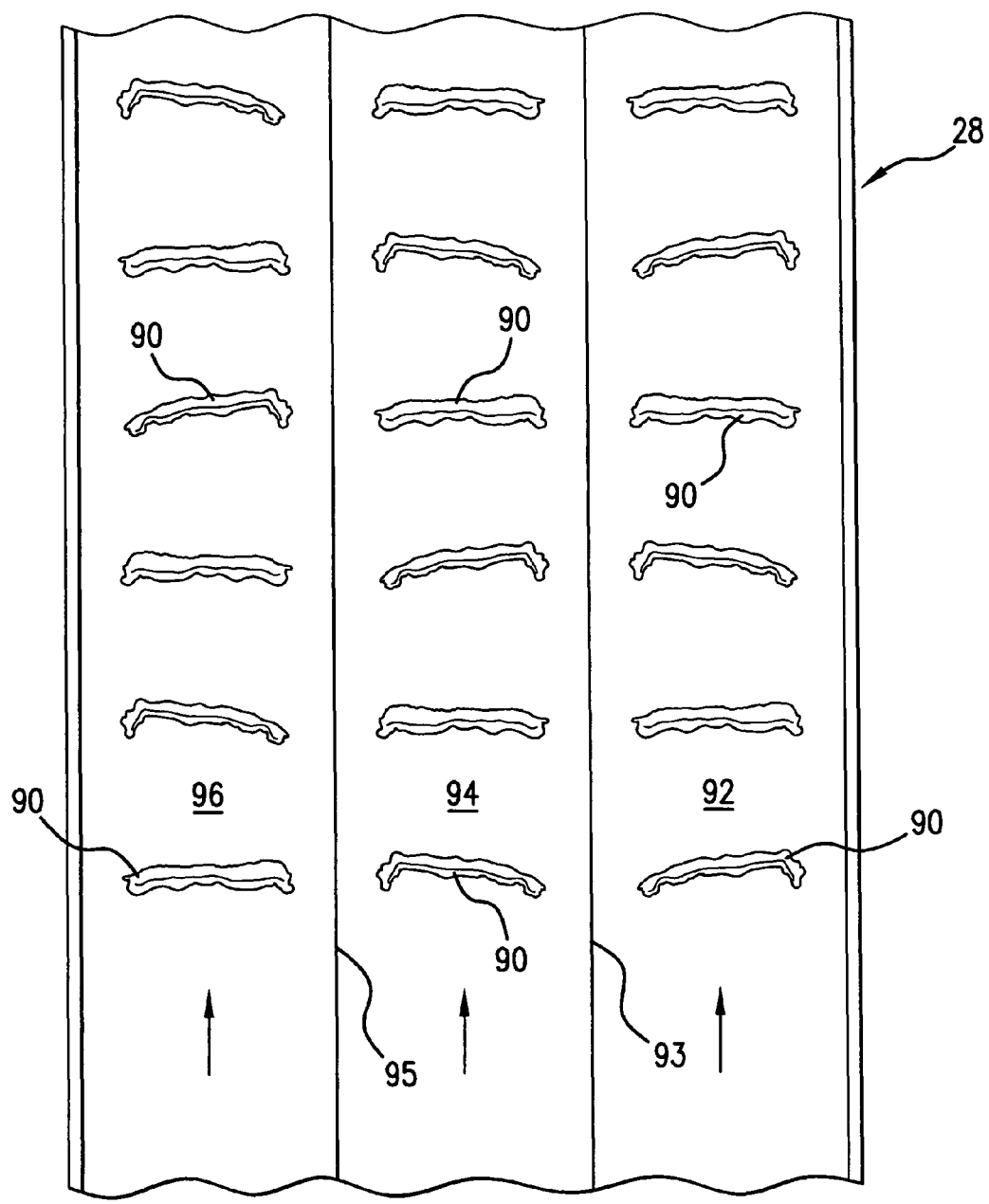
FIG. 5 schematically illustrates a particularly suitable placement of bacon strips on the conveyor belt of FIG. 3.

FIG. 5 schematically illustrates a particularly suitable placement of bacon strips on the conveyor 28. Prior to entering the spiral oven 10, the bacon strips 90 are placed on conveyor belt 28 in three rows. One row of bacon strips is continuously placed in a first end region 92 representing about one-third of the width of belt 28 and bounded by imaginary line 93. Another row of bacon strips is continuously placed in the middle region 94 of conveyor 28, representing about one-third of the width and bounded by imaginary lines 93 and 95. Another row of bacon strips is continuously placed in the second end region 96, representing about one-third of the width and bounded by imaginary line 95. The bacon strips 90 are placed sequentially in each row as shown, with the length of each bacon strip 90 roughly parallel to the width of the belt 28.

As conveyor belt 28 moves forward, the bacon strips 90 are evenly positioned across the belt width at a prescribed rate by a slicing and position machine (not shown). The bacon strips 90 are subsequently continuously fed into the inlet 26 of spiral oven chamber 12 as shown in FIGS. 1 and 2.

As explained above, the variable weave in the conveyor belt 28 causes the bacon strips 90 to cook more uniformly across the width of the belt 28. The mean bandwidth variation is determined by determining a first mean yield percentage for bacon strips cooked in the first end region 92, a second mean yield percentage for bacon strips cooked in the middle region 94, and a third mean yield percentage for bacon strips cooked in the second end region 96, of conveyor belt 28. To determine the mean yield percentage in each of the three regions, twenty-five or more bacon strips can be weighed before cooking in each region, and the same twenty-five or more bacon strips can be weighed after cooking in each region. The yield percentage for each bacon strip is the ratio of cooked weight to uncooked weight, multiplied by 100%. The mean yield percentage in each region is the average yield percentage for 25 or more bacon strips cooked in that region. The mean bandwidth variation is the difference between the highest and the lowest of the mean yield percentages for the three regions.

Because of the improved cooking uniformity achieved by the spiral oven 12 using the variable weave conveyor belt 28, the mean yield percentage for bacon strips cooked according to the process of the invention is not greater than 4.5%, suitably not greater than 3.5%, or not greater than 3.0%. This is substantially lower than the mean yield percentages achieved using a conventional linear microwave oven cooking process which can be around 6.0% or higher. When running this test, the oven can be set to a target percentage yield of about 35% to facilitate thorough cooking of the bacon strips.

One advantage of using the spiral oven with variable conveyor belt to cook bacon strips is that the oven capacity can be increased without increasing the floor space occupied by the oven. Referring to FIG. 2, the oven capacity can be increased by increasing the length of conveyor belt 28 so as to increase the number of spiral cooking tiers 30. The oven chamber 12 may contain at least 10, or at least 15, or at least 20, or at least 25 cooking tiers depending on the desired oven capacity. Because the cooking fluid is applied by forced convection through the conveyor belt 28 in the spiral tiers 30, the feed rate of cooking fluid, and/or the temperature of the cooking fluid, and the humidity of the cooking fluid, can be increased as needed to accommodate increased oven capacity.

The process of the invention not only provides for increased capacity, but also for increased overall yield of cooked bacon, without requiring increased floor space. For example, if a conventional linear microwave oven process has a mean bandwidth variation of 6.0%, it might then be necessary to target a yield of 34.0% in order to ensure that all of the bacon is cooked to a yield percentage of 40% or less, which typically represents thorough cooking. A target yield of 34.0% coupled with a mean bandwidth variation of 6.0% might reflect a mean bandwidth range of about 31.0% to about 37.0% for the three regions 92, 94 and 96 shown in FIG. 5. Because each region 92, 94 and 96 will also experience yield variations among individual bacon strips within that region, a mean yield percentage of 37.0 for the region of highest yield should ensure that substantially all of the bacon strips in that region have individual yield percentages of about 40 or less.

By contrast, the process of the invention can result in a mean bandwidth variation of about 3.0% or less. In this situation, a target yield of 37.0%, reflecting a mean bandwidth range of about 35.5% to about 38.5% for the three regions 92, 94 and 96, should ensure that substantially all of the bacon strips have yield percentages of about 40 or less. Thus, where the prior art linear microwave process may yield only about 3.4 kg of cooked bacon for each 10 kg of raw bacon (reflecting a 34% overall yield), the process of the invention may yield about 3.7 kg of cooked bacon for each 10 kg of the same raw bacon. In this example, the process of the invention might increase the overall yield of cooked bacon by about 9% (an increase of 3/34) while also providing bacon with more uniform cooking and quality.

Figure 6:
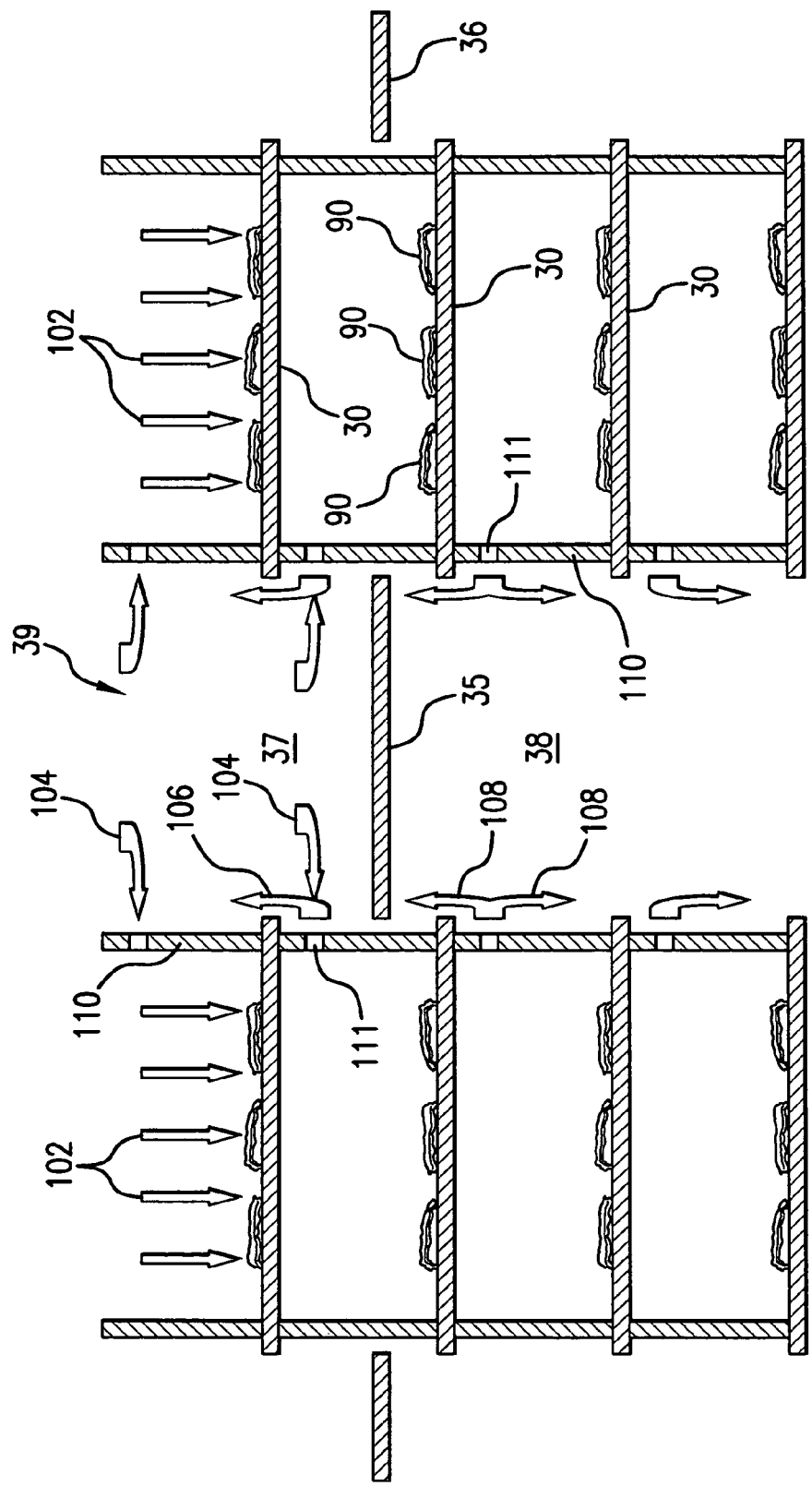
FIG. 6 schematically illustrates the vertical movement of at least one inner mezzanine in the eye between tiers of the spiral cooking oven, and how the mezzanine influences the flow of cooking fluid.

FIG. 6 schematically illustrates how one, or more than one vertically adjustable inner mezzanine floor 35 placed in the eye 39 defined by the spiral tiers 30 can be used to regulate the flow of cooking fluid through the tiers 30 inside the oven chamber 12. Cooking fluid such as steam or a steam/air mixture can be circulated directly into and through the spiral tiers 30 in the direction of arrows 102. Additional cooking fluid or air can be injected directly into the eye 39 defined by the spiral tiers 30. In the embodiment of FIG. 6 (compared to FIG. 1), upright steel beams 34 have been replaced with one or more walls 110 that isolate the eye 39 from the spiral tiers 30 except for the communicating openings 111 in the walls 110. The inner mezzanine floor 35 and walls 110 form a high pressure convection zone 37 that operates via openings 111 to keep most or essentially all of the cooking fluid that is injected into tiers 30 via arrows 102, from escaping the associated tiers 30 during the cooking process. While a small amount of cooking fluid may escape the tiers 30 via arrows 106, the opposing convection pressure represented by arrows 104 is sufficient to substantially prevent such escape.

Once the cooking fluid performs significant cooking and passes into the lower tiers 30, below the inner mezzanine floor 35, it is able to gradually diffuse into a low pressure region 38 of eye 39 through the corresponding openings 111, as represented by flow arrows 108. By adjusting the vertical height of mezzanine floor 35, the number of tiers 30 adjacent to high pressure convection zone 37, and therefore subjected to the most intensive cooking, can be increased or decreased. This provides another way to increase the cooking speed and/or capacity of spiral oven 10. If the number of tiers 30 is large, then a second inner mezzanine floor 35 (not shown) can be placed adjacent to the lower tiers 30. Cooking fluid can then be injected into the lower tiers and lower region of eye 39 to create a second high pressure convection zone and a corresponding second zone of high intensity cooking. By varying the vertical position and number of inner mezzanine floors 35, the operation of the spiral oven can be varied to accommodate space limitations, capacity requirements, cooking times, and other factors. For purposes of the invention, it is important that such features of the spiral oven 10 be tailored for uniform cooking and maximum yield percentage of thoroughly cooked bacon strips.

Suitable cooking conditions may vary depending on desired amount of cooking, oven capacity, bacon quality attributes and other characteristics. When a mixture of air and steam is used for the cooking fluid, cooking fluid temperatures up to about 230° C. are suitable. In an air/steam mixture, a humidity of up to about 85% moisture by volume (meaning 85% by volume moisture in the air/steam mixture) is suitable. A cooking fluid flow velocity of up to about 200 meters per minute through the vertical stack of spiral tiers 30 can be employed. Cooking residence times in the spiral oven may range from about 3-15 minutes, suitably 5-10 minutes. The conveyor belt 28 may travel at speeds up to about 25 meters per minute.

Figure 7:
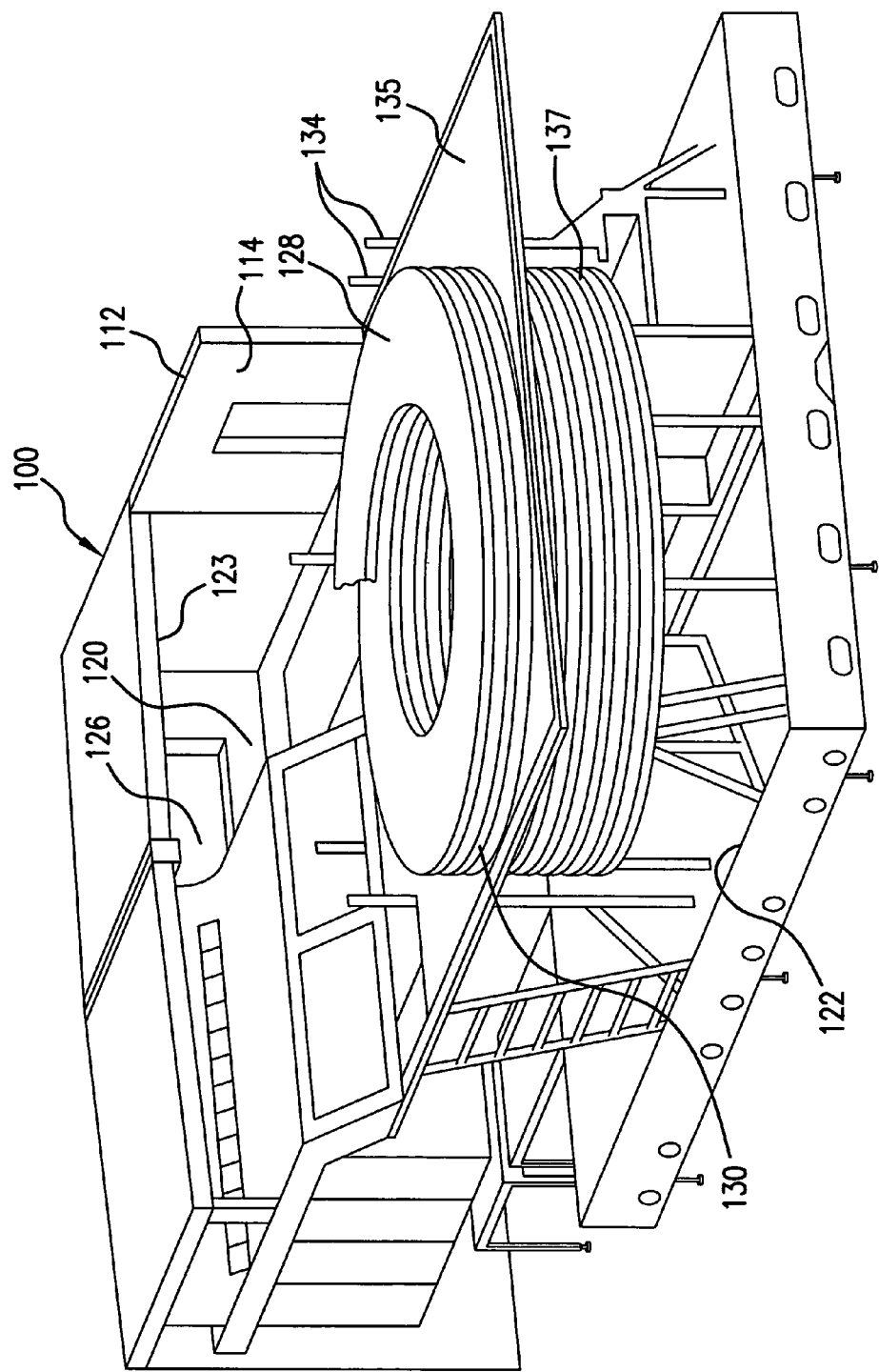
FIG. 7 is a partial cutaway perspective view of the cooking chamber of another embodiment of a spiral oven which can be used to practice the continuous process of the invention.
Figure 8:
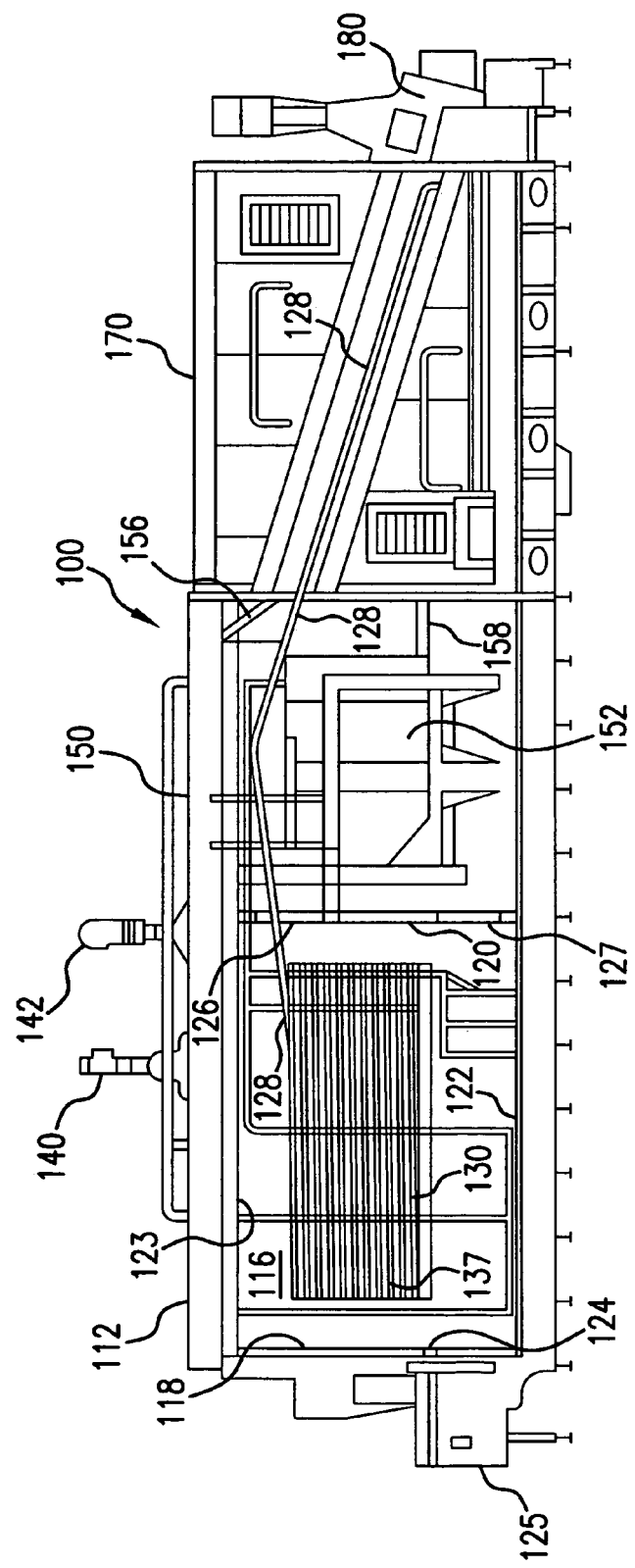
FIG. 8 is a side view of the spiral oven of FIG. 7 taken in section through the cooking chamber and other modules to expose the inner mechanics.

FIGS. 7 and 8 schematically illustrate another embodiment of a spiral cooking oven 100 that can be used to practice the process of the invention. Spiral cooking oven 100 includes a cooking chamber 112 having a front wall 114, a back wall 116, side walls 118 and 120, a floor 122 and a top wall 123. The walls define a substantially enclosed chamber having an inlet 124 which can be formed in side wall 118, and an outlet 126 which can be formed in side wall 120.

The spiral cooking oven 100 includes three sections, namely the cooking chamber 112, an air handling module 150, and an optional impingement module 170. The cooking chamber 112 substantially encloses an endless conveyor belt 128, suitably having variable weaving and variable sized openings as described above with respect to FIGS. 3 and 4. The endless conveyor belt 128 receives bacon strips deposited by an in-feed apparatus 125 through the inlet 124. The endless conveyor belt 128 carries the bacon strips through a spiral path defining a plurality of superimposed, helically extending spiral tiers 130 forming a belt pile 137. The bacon strips enter the belt pile 137 at the bottom and leave the belt pile 37 at its top.

The spiral path can be surrounded by one or more vertically movable mezzanine floors 135 supported by steel posts 134. The mezzanine floors 135 can be used to help regulate the flow of cooking fluid within chamber 112, and divide the cooking chamber into regions of high and low pressure a manner similar to that described above with respect to FIG. 6. Bacon is transported through the belt pile 137 and is then carried by the endless belt 128 through the air handling module 150, downward at an angle through the impingement module 170, and out through a discharge apparatus 180 at about the same elevation as inlet 124.

Cooking fluid can be directed through the spiral tiers 130 of the belt pile 137 in a manner similar to that described above with respect to FIGS. 2 and 6. The cooking fluid can be condensing steam, high pressure condensing steam, or a mixture of condensing steam and air. Condensing steam at an operating temperature up to about 232° C., mixed with air to provide a moisture by volume up to about 85% of saturation, is a particularly suitable cooking medium for the cooking of bacon strips. The composition of this cooking fluid, and the flow and circulation of cooking fluid within the cooking chamber 112, can be regulated with the assistance of an air handling system 152 positioned in the air handling module 150. The air handling system 152 can be any air handling apparatus suitable for supplying appropriate quantities of heated air into the cooking chamber 112, and suitably includes one or more large fans.

The steam component of the cooking fluid can be injected directly into the cooking chamber 112 using steam pipes (not shown), typically located near the floor 122. The air component can be injected through the opening 126 near the top of end wall 120 and can leave the cooking chamber 112 through opening 127 near the bottom end wall 120, to facilitate a downward flow of cooking fluid through the belt pile 137, similar to the flow described above with respect to FIGS. 2 and 6. Alternatively, the flow can be reversed by injecting cooking fluid through opening 127 and allowing it to leave cooking chamber 112 through opening 126. The direction of cooking fluid is controlled by the positioning of upper and lower gates 156 and 158 at the blowing end of air handling apparatus 152, which can be a large fan. When gate 156 is open and gate 158 is closed, the air takes an upper path that directs cooking fluid downward through belt pile 137. When gate 156 is closed and gate 158 is open, the air takes a lower path that directs cooking fluid upward through belt pile 137. Exhaust stacks 140 and 142 are provided in the top wall 123 of cooking chamber 112.

The optional impingement module 170 is typically not needed for the cooking of bacon. When used, the impingement module 170 can supply high temperature, high velocity air at a temperature up to about 282° C. and a velocity up to about 1280 meters per minute, to the belt 128. The high velocity impingement air can be supplied from the air handling module 150; or from another source. Vents 172 and 174 facilitate the circulation of impingement air when used. During most operations, impingement air is not used. The endless conveyor 128 transports the bacon strips through the impingement module 170 and out through the discharge apparatus 180.

The embodiments of the invention disclosed herein are exemplary, and various modifications and improvements can be made without departing from the invention. The scope of the invention is indicated by the appended claims, and all changes that fall within the scope of equivalents are intended to be embraced therein.

EXAMPLE I

Comparative

Approximately ninety bacon slices were cooked using a conventional linear microwave oven process with cooking parameters tailored to provide a target yield percentage of 34.0. The bacon strips had a raw weight range of about 87-160 grams per strip. One-third of the bacon slices were placed in a left side region of the conveyor belt, one-third were placed in a center region, and one-third were placed in a right side region. The individual bacon strips were weighed before and after cooking to determine a yield percentage for each bacon strip. The yield percentages for the bacon strips in each of the three regions were averaged to determine the mean yield percentage for that region. The mean bandwidth variation was calculated as the difference between the highest and the lowest of the three mean yield percentages. The results are summarized as follows.

|  | Left Side Region | Center Region | Right Side Region | Variation |
| --- | --- | --- | --- | --- |
| Mean Yield Percentage | 39.7 | 33.7 | 35.9 | 6.0 |
| Minimum Yield Percentage | 35.1 | 20.1 | 32.6 | 15.0 |
| Maximum Yield Percentage | 46.0 | 56.3 | 40.2 | 16.1 |

As shown above, the microwave oven process exhibited a mean bandwidth variation of 6.0%. Even though the yield percentage was targeted at 34.0% based on the center of the belt, the mean yield percentage rose to almost 40% in the left side region of the belt where microwave cooking was less efficient. In essence, it was necessary to overcook much of the bacon in order to ensure that all of the bacon strips were adequately cooked.

EXAMPLE II

Inventive

Approximately ninety bacon strips were cooked using a spiral cooking oven Model Gyro-Compact® II, the latest generation spiral oven available from JBT Corporation, modified to include a variable weave spiral conveyor belt as described above. The variable weave spiral conveyor belt had an outer portion 70 with a 9-mm pitch between adjacent links 78 and an inner portion 72 with a 13 mm pitch between adjacent links 84, as shown in FIGS. 3 and 4. The conveyor belt followed a spiral path in the oven including 10 spiral tiers.

When the conveyor belt assumed the spiral configuration, the areal size of the openings 86 in the inner portion 72 approximated the areal size of the openings 80 in the outer portion 70. The bacon strips had a raw weight range of about 87-160 grams per strip. The bacon strips were cooked using a mixture of steam and heated air at atmospheric pressure and a temperature of about 210° C. The steam and heated air were proportioned to provide a moisture by volume of about 70% in the oven chamber. The recirculating cooking fluid was fed from the top of the oven chamber in to the spiral tiers and an annulus defined by the spiral tiers at a total rate of 600 cubic feet (182 meters) per minute. A single mezzanine floor in the eye created a convection zone near the top of the spiral tier stack, causing most of the cooking fluid to pass through the spiral tiers and perform the cooking operation.

The cooking parameters were tailored to provide a target yield percentage of 34.0 and 7 minutes of cooking time. One-third of the bacon slices were placed in a left side region of the conveyor belt, one-third were placed in a center region, and one-third were placed in a right side region. The individual bacon strips were weighed before and after cooking to determine a yield percentage for each bacon strip. The yield percentages for the bacon strips in each of the three regions were averaged to determine a mean yield percentage for that region. The mean bandwidth variation was calculated as the difference between the highest and the lowest of the three mean yield percentages. The results are summarized as follows.

|  | Left Side Region | Center Region | Right Side Region | Variation |
| --- | --- | --- | --- | --- |
| Mean Yield Percentage | 32.3 | 35.2 | 34.1 | 2.9 |
| Minimum Yield Percentage | 25.5 | 25.4 | 25.5 | 0.1 |
| Maximum Yield Percentage | 37.8 | 48.4 | 46.4 | 10.6 |

The spiral oven process exhibited a mean bandwidth variation of 2.9%, less than half of the mean bandwidth variation of the microwave oven process. This would enable a user to raise the target yield by a full three percentage points (resulting in a 9% increase in total product weight) while achieving more uniform cooking of the bacon, without increasing the frequency of undercooked bacon strips.

We claim:

1. A continuous process for cooking bacon, comprising the steps of:
   continuously feeding bacon strips in three or more rows to an inlet of a spiral cooking oven;
   moving the bacon strips along a conveyor belt in a spiral path inside the spiral oven, wherein the conveyor belt comprises a woven wire material having at least an inner portion with openings and an outer portion with openings, wherein the inner portion is closer to a center of the spiral path than the outer portion, the openings in the inner portion being larger than the openings in the outer portion when the conveyor belt is straight, and wherein the openings in the inner portion and the openings in the outer portion have a similar effective areal size when the conveyor belt is in the spiral path;
   applying a cooking fluid into the spiral oven and through the spiral path; and
   cooking the bacon strips in the spiral oven to a mean yield percentage having a mean bandwidth variation not greater than 4.5%.

2. The process of claim wherein the spiral oven comprises a conveyor belt for moving the bacon strips along the spiral path.

3. The process of claim 1, wherein the cooking fluid is applied in a predominantly vertical direction through the spiral path.

4. The process of claim 1 wherein he cooking fluid is applied by forced convection.

5. The process of claim 1, wherein the cooking fluid comprises condensing steam.

6. The process of claim 1, wherein the cooking fluid comprises heated air.

7. The process of claim 1, wherein the bacon strips are cooked to a mean yield percentage having a mean bandwidth variation not greater than 3.5%.

8. The process of claim 1, wherein the bacon strips are cooked to a mean yield percentage having a mean bandwidth variation not greater than 3.0%.

9. The process claim 1, wherein the mean yield percentage for the cooked bacon strips is at least 35%.

10. The process of claim 1, further comprising the step of directing the cooking fluid into the spiral path by placing one or more mezzanines in an eye of the spiral path.

11. A continuous process for cooking bacon, comprising the steps of:
    continuously feeding bacon strips to an inlet of a Spiral cooking oven;
    moving the bacon strips along a conveyor belt including at least an inner portion, an outer portion and a spiral path inside the spiral oven, wherein the inner portion is closer to a center of the spiral path than the outer portion, wherein the conveyor belt is formed by weaving a wire material to create the inner portion with openings and the outer portion with openings, and the openings in the inner portion are larger than the openings in the outer portion when the conveyor belt is straight, and wherein the openings in the inner portion and the openings in the outer portion have a similar effective areal size when the conveyor belt is in the spiral path;
    applying a cooking fluid into the spiral oven and through the conveyor belt;
    cooking the bacon strips in the spiral oven; and wherein the bacon strips have a mean bandwidth variation of not more than 3.5% following cooking.

12. The process of claim 11, wherein the conveyor belt is formed by weaving the wire material to create a plurality of openings which are progressive from the larger openings to the smaller openings along a width of the conveyor bolt when the convey belt is straight.

13. The process of claim 11, Wherein the conveyor belt has openings of uniform size when the conveyor belt assumes a spiral configuration inside the spiral oven.

14. The process of claim 11, wherein the cooking fluid passes into an annulus defined by the spiral path of the conveyor b it and through openings in the spiral conveyor belt.

15. The process of claim 11, wherein the bacon strips are positioned in at least three rows along a width of the conveyor belt.

16. A continuous process for cooking bacon, comprising the steps of:
    continuously feeding bacon strips to an inlet of a spiral cooking oven;
    moving the bacon strips along a conveyor belt defining a spiral path inside the spiral oven, wherein the conveyor belt comprises a woven wire material having at least an inner portion with openings and an outer portion with openings, wherein the inner portion is closer to the center of the spiral path that the outer portion, the openings in the inner portion being larger than the openings in the outer portion when the conveyor belt is straight, and wherein the opening in the inner portion and the openings in the outer portion have a similar effective areal size when the conveyor belt is in the spiral path;

applying a cooking fluid into the oven and through the conveyor belt; and cooking the bacon strips in the oven;

wherein the spiral path defined by the conveyor belt has at least 15 tiers and an inner mezzanine floor having an adjustable height is positioned in an eye of the spiral path; and wherein the bacon strips have a mean bandwidth variation of not more than 3.5% following cooking.

17. The process of claim 16, wherein the spiral path defined by the conveyor belt has at least 20 tiers.

18. The process of claim wherein the conveyor belt has progressive weaving which defines openings of substantially uniform size when the conveyor belt assumes a. spiral configuration inside the spiral oven.

19. The process of claim 16, wherein the cooking fluid comprises steam and heated air.

\* \* \* \* \*

UNITED STATES PATENT AND TRADEMARK OFFICE
CERTIFICATE OF CORRECTION

| | |
|---|---|
| PATENT NO. | : 8,753,703 B2 |
| APPLICATION NO. | : 12/589502 |
| DATED | : June 17, 2014 |
| INVENTOR(S) | : R. M. Gunawardena et al. |

It is certified that error appears in the above-identified patent and that said Letters Patent is hereby corrected as shown below:

In The Claims

| COLUMN | LINE | ERROR |
|---|---|---|
| 10 (Claim 2, | 1 line 1) | "claim wherein" should read --claim 1, wherein-- |
| 10 (Claim 11, | 26 line 3) | "a Spiral" should read --a spiral-- |
| 10 (Claim 12, | 48 line 4) | "conveyor bolt" should read --conveyor belt-- |
| 10 (Claim 14, | 55 line 3) | "b it and" should read --belt and-- |
| 11 (Claim 18, | 18 line 1) | "claim wherein" should read --claim 16, wherein-- |

Signed and Sealed this
First Day of March, 2016

Michelle K. Lee
*Director of the United States Patent and Trademark Office*